(12) United States Patent
Morita (10) Patent No.: US 10,304,631 B2
(45) Date of Patent: May 28, 2019

(54) CERAMIC ELECTRONIC COMPONENT AND METHOD OF PRODUCING THE SAME

(71) Applicant: Taiyo Yuden Co., Ltd., Tokyo (JP)

(72) Inventor: Koichiro Morita, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/360,387

(22) Filed: Nov. 23, 2016

(65) Prior Publication Data

US 2017/0154732 A1 Jun. 1, 2017

(30) Foreign Application Priority Data

Nov. 26, 2015 (JP) .................................. 2015-230349

(51) Int. Cl.
| | |
|---|---|
| *H01G 4/30* | (2006.01) |
| *H01G 4/008* | (2006.01) |
| *H01G 4/228* | (2006.01) |
| *H01G 4/012* | (2006.01) |
| *H01G 4/232* | (2006.01) |
| H01G 4/12 | (2006.01) |

(52) U.S. Cl.
CPC .............. *H01G 4/30* (2013.01); *H01G 4/008* (2013.01); *H01G 4/012* (2013.01); *H01G 4/228* (2013.01); *H01G 4/232* (2013.01); H01G 4/12 (2013.01)

(58) Field of Classification Search
CPC .......... H01G 4/005; H01G 4/012; H01G 4/12; H01G 4/30; H01G 4/228; H01G 4/232; H01G 4/248
See application file for complete search history.

(56) References Cited

U.S. PATENT DOCUMENTS

| | | | |
|---|---|---|---|
| 6,930,876 B1 * | 8/2005 | Noguchi | .................. H01G 4/12 |
| | | | 361/311 |
| 7,265,072 B2 * | 9/2007 | Watanabe | ............... C04B 35/48 |
| | | | 361/321.4 |

(Continued)

FOREIGN PATENT DOCUMENTS

| | | |
|---|---|---|
| CN | 1268757 A | 10/2000 |
| CN | 1993783 B | 9/2010 |

(Continued)

OTHER PUBLICATIONS

Office Action dated Feb. 20, 2018 in Japanese Application No. 2015-230349, along with its English translation.

(Continued)

*Primary Examiner* — Nguyen T Ha
(74) *Attorney, Agent, or Firm* — Saliwanchik, Lloyd & Eisenschenk (57) ABSTRACT

A ceramic electronic component includes a ceramic body and external electrodes. The ceramic body includes ceramic layers formed of a ceramic material and laminated in a first axis direction, and internal electrode layers each including an extracted portion and disposed between the ceramic layers, the extracted portion being extracted to a circumference of each of the ceramic layers and having a width of 100 μm or less along the circumference. The external electrodes contain the ceramic material, the external electrodes being provided to a surface of the ceramic body and each connected to the extracted portion.

7 Claims, 11 Drawing Sheets

(56) References Cited

U.S. PATENT DOCUMENTS

| | | | |
|---|---|---|---|
| 7,508,647 B2* | 3/2009 | Takashima | H01G 4/232 361/301.4 |
| 7,528,088 B2* | 5/2009 | Umeda | B82Y 30/00 361/321.4 |
| 2001/0007522 A1* | 7/2001 | Nakagawa | H01G 4/38 361/301.4 |
| 2002/0039273 A1 | 4/2002 | Nakamura | |
| 2007/0121275 A1 | 5/2007 | Takashima | |
| 2009/0059469 A1* | 3/2009 | Lee | H01G 4/012 361/306.2 |
| 2012/0113563 A1* | 5/2012 | Kuroda | H01G 4/012 361/328 |
| 2013/0009515 A1 | 1/2013 | Kim et al. | |
| 2013/0020914 A1* | 1/2013 | Tsukida | H01G 4/30 310/366 |
| 2013/0229748 A1* | 9/2013 | Chung | H01G 4/005 361/301.4 |
| 2013/0258546 A1 | 10/2013 | Kim et al. | |
| 2015/0014040 A1* | 1/2015 | Ahn | H01G 4/30 361/301.4 |
| 2015/0090485 A1* | 4/2015 | Lee | H01G 2/065 174/260 |
| 2015/0364260 A1* | 12/2015 | Lee | H01G 2/065 174/260 |
| 2016/0233029 A1* | 8/2016 | Oh | H01G 4/30 |

FOREIGN PATENT DOCUMENTS

| | | |
|---|---|---|
| CN | 102867567 A | 1/2013 |
| CN | 103366956 A | 10/2013 |
| CN | 104517730 A | 4/2015 |
| JP | 2000-348964 A | 12/2000 |
| JP | 2002-299154 A | 10/2002 |
| JP | 2003168623 | 6/2003 |
| JP | 2003264118 | 9/2003 |
| JP | 2006157035 | 6/2006 |
| JP | 2007-142107 A | 6/2007 |
| JP | 2009-206460 A | 9/2007 |
| JP | 3998033 B2 | 10/2007 |
| JP | 2007-300148 A | 11/2007 |
| JP | 2009004734 | 1/2009 |

OTHER PUBLICATIONS

Office Action dated Oct. 15, 2018 in Chinese Application No. 201611055202.1, along with its English translation.

Office Action dated Apr. 12, 2018 in Korean Application No. 10-2016-0152612, along with its English translation.

* cited by examiner

CERAMIC ELECTRONIC COMPONENT AND METHOD OF PRODUCING THE SAME

CROSS REFERENCE TO RELATED APPLICATION

This application claims the benefit under 35 U.S.C. § 119 of Japanese Patent Application No. 2015-230349, filed Nov. 26, 2015, which is hereby incorporated by reference in its entirety.

BACKGROUND

The present invention relates to a ceramic electronic component such as a multi-layer ceramic capacitor, which is small but has high reliability, and to a method of producing the ceramic electronic component.

In recent years, along with a demand for miniaturization and integration of devices including electronic circuits, electronic components such as capacitors mounted to those devices are also demanded for miniaturization and integration.

In this regard, as disclosed in Japanese Patent Application Laid-open No. 2003-168623, for example, a capacitor array including multi-layer ceramic capacitors disposed in an array is known. The capacitor array disclosed in Japanese Patent Application Laid-open No. 2003-168623 includes capacitors each including internal electrodes and external electrodes, for example. Such a capacitor array includes multiple internal electrodes in one layer. The internal electrodes are each extracted to the surface of the capacitor array and connected to the external electrodes. In other words, the multiple external electrodes (terminals) are formed on one side surface of the capacitor array.

Further, such an array structure can reduce an equivalent series inductance (ESL) of each multi-layer ceramic capacitor itself. The ESL becomes a problem, for example, when the multi-layer ceramic capacitor is used as a decoupling capacitor in an IC power circuit. The IC power circuit supplies power to an integrated circuit (IC) that operates at a high frequency.

For example, Japanese Patent Application Laid-open Nos. 2006-157035 and 2009-4734 each disclose a multi-layer ceramic capacitor having an array structure. In the multi-layer ceramic capacitor, in order to reduce the ESL, arrangement of the external electrodes (terminals) of the capacitors, arrangement of extracted portions of the internal electrodes, which are extracted to the external electrodes, and the like are designed.

However, along with the progress in miniaturization and achievement of a multi-terminal structure, it is difficult to ensure reliability of connection between the internal electrodes and the external electrodes. One of causes of the difficulty is a large difference in amount of shrinkage at the time of sintering between a ceramic material and an electrode material mainly containing a metal material.

Japanese Patent Application Laid-open No. 2003-264118 discloses a multi-layer ceramic capacitor, in which an extracted portion of an internal electrode is made thinner than the internal electrode in order to reduce the amount of shrinkage of the extracted portion at the time of sintering.

BRIEF SUMMARY

However, in the multi-layer ceramic capacitor disclosed in Japanese Patent Application Laid-open No. 2003-264118, along with the progress of the miniaturization, the amount of the reduced thickness of the extracted portion of the internal electrode becomes small. This makes it difficult to enhance the reliability of connection. Further, when the internal electrode is made thicker, the number of layers to be laminated is limited. This leads to a possibility that a capacitance is reduced.

In view of the circumstances as described above, it is desirable to provide a ceramic electronic component such as a multi-layer ceramic capacitor, which is small but capable of improving reliability of connection between internal electrodes and external electrodes, and a method of producing the ceramic electronic component.

According to an embodiment of the present invention, there is provided a ceramic electronic component including a ceramic body and external electrodes.

The ceramic body includes ceramic layers and internal electrode layers.

The ceramic layers are formed of a ceramic material and laminated in a first axis direction.

The internal electrode layers each include an extracted portion and disposed between the ceramic layers, the extracted portion being extracted to a circumference of each of the ceramic layers and having a width of 100 µm or less along the circumference.

The external electrodes contain the ceramic material, the external electrodes being provided to a surface of the ceramic body and each connected to the extracted portion.

According to the configuration described above, since the external electrodes contain the ceramic material, thermal shrinkage of the external electrodes can be suppressed when the ceramic body and the external electrodes are sintered in the same step. As a result, stress added to connection portions between the external electrodes and the extracted portions can be reduced, and the reliability of connection between the external electrodes and the internal electrode layers can be enhanced. Further, since the reliability of connection is enhanced, the widths of the extracted portions along the circumferences can be set to 100 µm or less. This can contribute to the miniaturization of the ceramic electronic component.

Specifically, the surface of the ceramic body may include a pair of main surfaces facing each other in the first axis direction, and a pair of first side surfaces adjacently connected to the pair of main surfaces and facing each other in a second axis direction intersecting with the first axis direction. The external electrodes may be provided to the pair of first side surfaces.

In this case, the external electrodes may include three or more pairs of external electrodes, the three or more pairs of external electrodes being provided to each of one side surface and the other side surface of the pair of first side surfaces.

Alternatively, the surface of the ceramic body may further include a pair of second side surfaces adjacently connected to the pair of main surfaces and facing each other in a third axis direction intersecting with the first axis direction and the second axis direction. The external electrodes may be provided to at least one side surface of the pair of first side surfaces and at least one side surface of the pair of second side surfaces.

In such a manner, the ceramic electronic component can have a configuration including many external electrodes.

Further, the ceramic body may have a length of 1 mm or less along a longitudinal direction and a length of 0.5 mm or less along a lateral direction when the ceramic body is viewed in the first axis direction.

In such a manner, the ceramic electronic component can be made small.

Further, the external electrodes may contain a metal material as a main component, the metal material being the same as a main component of the internal electrode layers.

As a result, when the external electrodes and the ceramic body are sintered in the same step, thermal shrinkage percentages of the external electrodes and the internal electrode layers can be made substantially the same, and the reliability of connection between the external electrodes and the internal electrode layers can be enhanced more.

The metal material may be nickel (Ni).

Nickel has a relatively high melting point, and is thus suitable when the ceramic layers and the internal and external electrodes are sintered in the same step. Further, costs of the metal material can also be controlled.

According to another embodiment of the present invention, there is provided a method of producing a ceramic electronic component, the method including: forming internal electrode patterns on unsintered ceramic sheets formed of a ceramic material, the internal electrode patterns each including an extracted portion, the extracted portion being extracted to a circumference of each of the unsintered ceramic sheets and being formed to have a width of 100 μm or less along the circumference after sintering.

The unsintered ceramic sheets including the internal electrode patterns are laminated in one axial direction to form an unsintered ceramic body.

Unsintered external electrodes are formed on a surface of the unsintered ceramic body to be connected to the extracted portions, the unsintered external electrodes containing the ceramic material.

The unsintered ceramic body provided with the unsintered external electrodes is sintered. According to the above-mentioned method, the ceramic body and the external electrodes can be sintered in the same step, and the reliability of connection between the external electrodes and the internal electrode layers can be enhanced. Further, since the external electrodes contain the ceramic material, as described above, stress added to connection portions between the external electrodes and the extracted portions can be reduced, and the reliability of connection between the external electrodes and the internal electrode layers can be enhanced. Furthermore, since the reliability of connection is enhanced, the widths of the extracted portions along the circumferences can be set to 100 μm or less. This can contribute to the miniaturization of the ceramic electronic component.

Further, when a whole of the unsintered external electrodes is assumed to have 100 pts.mass, the unsintered external electrodes may contain the ceramic material of 10 pts.mass or more and 40 pts.mass or less.

When such an amount of the ceramic material is added, thermal shrinkage percentages of the ceramic sheets and the external electrodes can be sufficiently reduced.

As described above, according to the present invention, it is possible to provide a ceramic electronic component such as a multi-layer ceramic capacitor, which is small but capable of improving reliability of connection between internal electrodes and external electrodes, and a method of producing the ceramic electronic component.

These and other objects, features and advantages of the present invention will become more apparent in light of the following detailed description of embodiments thereof, as illustrated in the accompanying drawings.

DETAILED DESCRIPTION OF EMBODIMENTS

A ceramic electronic component according to an embodiment of the present invention will be described.

Configuration of Ceramic Electronic Component (Multi-Layer Ceramic Capacitor)

Figure 1:
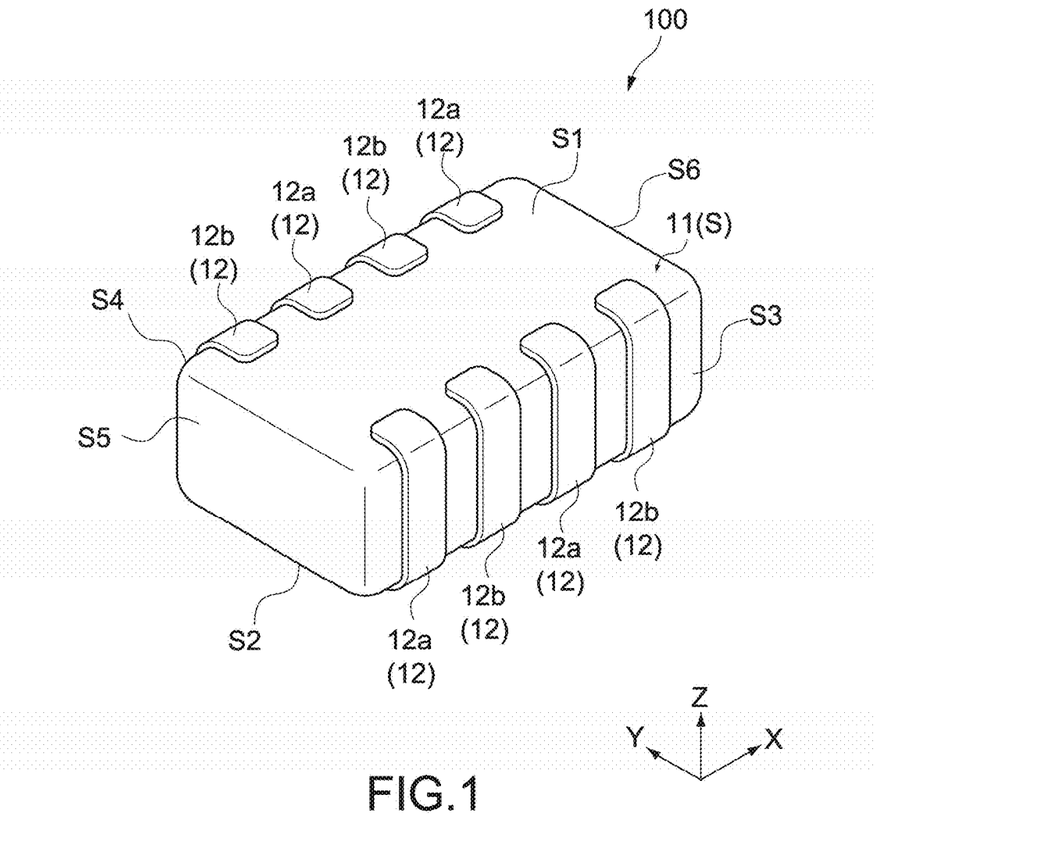
FIG. 1 is a perspective view of a ceramic electronic component (multi-layer ceramic capacitor) according to one embodiment of the present invention.
Figure 2:
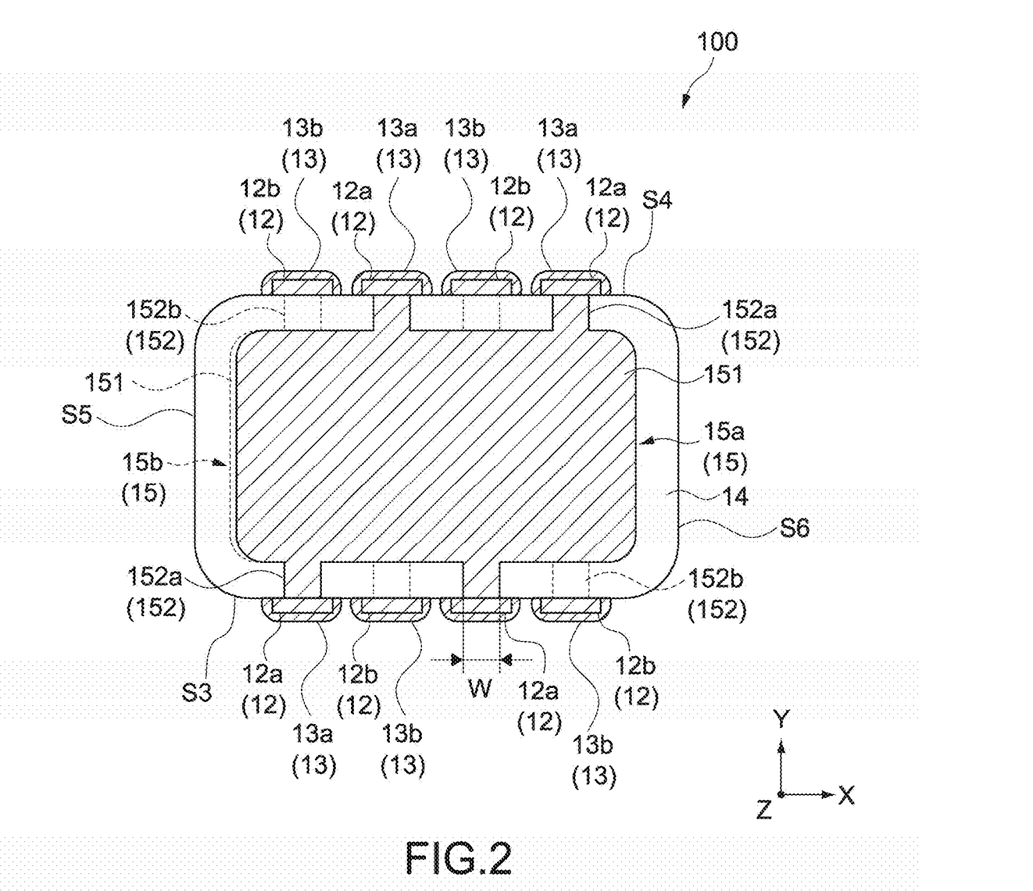
FIG. 2 is a cross-sectional view of the multi-layer ceramic capacitor shown in FIG. 1 when viewed in a Z-axis direction.

FIG. 1 is a perspective view of a ceramic electronic component according to this embodiment. FIG. 2 is a cross-sectional view of the ceramic electronic component when viewed in a Z-axis direction. In each figures, three axial directions orthogonal to one another are assumed to be an X-axis direction (second axis direction), a Y-axis direction (third axis direction), and a Z-axis direction (first axis direction), and the Z-axis direction is assumed to be a thickness direction of the ceramic electronic component.

In this embodiment, for example, the ceramic electronic component may be configured to be a multi-layer ceramic capacitor (MLCC) 100, which is small, has a high capacitance, and includes many terminals.

As shown in FIGS. 1 and 2, the multi-layer ceramic capacitor 100 includes a ceramic body 11, external electrodes 12, and plating films 13.

It should be noted that illustration of the plating films 13 is omitted in FIG. 1.

1.1 Outline Configuration of Ceramic Body

As shown in FIG. 1, the ceramic body 11 has a plurality of surfaces and typically has a three-dimensional shape similar to a rectangular parallelepiped. Those surfaces may be flat surfaces or curved surfaces. When those surfaces are curved surfaces, each surface may bulge outward. Further, ridge lines forming boundaries between adjacent surfaces may be rounded as shown in FIG. 1 or may be angulated.

In the example shown in FIG. 1, a surface S of the ceramic body 11 includes six surfaces. Specifically, the six surfaces are two main surfaces S1 and S2, a pair of first side surfaces S3 and S4, and a pair of second side surfaces S5 and S6. The two main surfaces S1 and S2 face each other in the Z-axis direction. The first side surfaces S3 and S4 are adjacent to the two main surfaces S1 and S2 and face each other in the Y-axis direction. The second side surfaces S5 and S6 are adjacent to the two main surfaces S1 and S2 and face each other in the X-axis direction orthogonal to the Y-axis direction.

The size of the ceramic body 11 is not particularly limited. For example, the ceramic body 11 may have a length of 1 mm or less along a longitudinal direction and have a length of 0.5 mm or less along a lateral direction when viewed in the Z-axis direction. The "longitudinal direction when viewed in the Z-axis direction" herein refers to a length of the longest part of the ceramic body 11 when viewed in the Z-axis direction. The "lateral direction when viewed in the Z-axis direction" herein refers to a length of the shortest part of the ceramic body 11 when viewed in the Z-axis direction. In this embodiment, the longitudinal direction when viewed in the Z-axis direction is the X-axis direction, and the lateral direction when viewed in the Z-axis direction is the Y-axis direction.

In other words, the first side surfaces S3 and S4 face each other in the lateral direction, and the second side surfaces S5 and S6 face each other in the longitudinal direction.

1.2 Configuration of External Electrodes

The external electrodes 12 are provided to the surface S of the ceramic body 11 and connected to extracted portions 152 of internal electrode layers 15, which will be described later. With reference to FIG. 1, each of the external electrodes 12 is formed into a strip extending in the Z-axis direction from one of the two main surfaces, the main surface S1, to the other main surfaces S2, for example.

In this embodiment, the external electrodes 12 are provided to the pair of first side surfaces S3 and S4.

In the multi-layer ceramic capacitor 100, three or more external electrodes 12 may be disposed on each of one side surface S3 and the other side surface S4 of the pair of first side surfaces S3 and S4. In the example shown in FIGS. 1 and 2, four external electrodes 12 are disposed on each of one side surface S3 and the other side surface S4 of the pair of first side surfaces S3 and S4. When the plurality of external electrodes 12 is provided in this manner, the internal electrode layers 15 can be extracted to a plurality of spots of the side surfaces, and can thus configure a multi-layer ceramic capacitor 100 having a multi-terminal structure. The internal electrode layers 15 will be described later.

The external electrodes 12 contain a metal material as a main component. Examples of the metal material include nickel (Ni), copper (Cu), palladium (Pd), platinum (Pt), silver (Ag), gold (Au), or an alloy of those metals. In this embodiment, for example, the metal material may be Ni. Alternatively, the metal material may be the same metal material as the main component of the internal electrode layers 15, which will be described later.

The external electrodes 12 contain a ceramic material used in the ceramic body 11, in addition to the main component. The ceramic material will be described later.

The external electrodes 12 include first external electrodes 12a and second external electrodes 12b. Voltages having different polarities are applied to the first external electrodes 12a and the second external electrodes 12b.

A voltage of a first polarity (for example, negative voltage) may be applied to the first external electrodes 12a. In this embodiment, the first external electrodes 12a are disposed on both of one side surface S3 and the other side surface S4 of the pair of first side surfaces. In the example shown in FIGS. 1 and 2, two first external electrodes 12a are disposed on the first side surface S3, and two first external electrodes 12a are disposed on the first side surface S4.

A voltage of a second polarity (for example, positive voltage) different from the first polarity may be applied to the second external electrodes 12b. The second external electrodes 12b are similarly disposed on both of one side surface S3 and the other side surface S4 of the pair of first side surfaces. In the example shown in FIGS. 1 and 2, two second external electrodes 12b are disposed on the first side surface S3, and two second external electrodes 12b are disposed on the first side surface S4.

Further, in this embodiment, the first external electrodes 12a and the second external electrodes 12b are alternately disposed along the X-axis direction. Those external electrodes 12a and 12b are provided to be sufficiently apart from the adjacent external electrodes 12a and 12b.

1.3 Configuration of Plating Films

As shown in FIG. 2, the plating films 13 are films to cover the external electrodes 12. The plating films 13 are formed by plating. In this embodiment, the external electrodes 12 and the plating films 13 to cover the external electrodes 12 function as external terminals of the multi-layer ceramic capacitor 100.

Further, each of the plating films 13 may be a single layer or may include a plurality of layers. Furthermore, a material of each layer may be different or may be the same.

A material of the plating films 13 may be any one of Cu, Ni, and tin (Sn), or a combination of those metals, for example.

Additionally, the plating films 13 include first plating films 13a and second plating films 13b. The first plating films 13a cover the first external electrodes 12a. The second plating films 13b cover the second external electrodes 12b. The first plating films 13a and the first external electrodes 12a function as external terminals having the first polarity. The second plating films 13b and the second external electrodes 12b function as external terminals having the second polarity.

1.4 Internal Configuration of Ceramic Body

Figure 3:
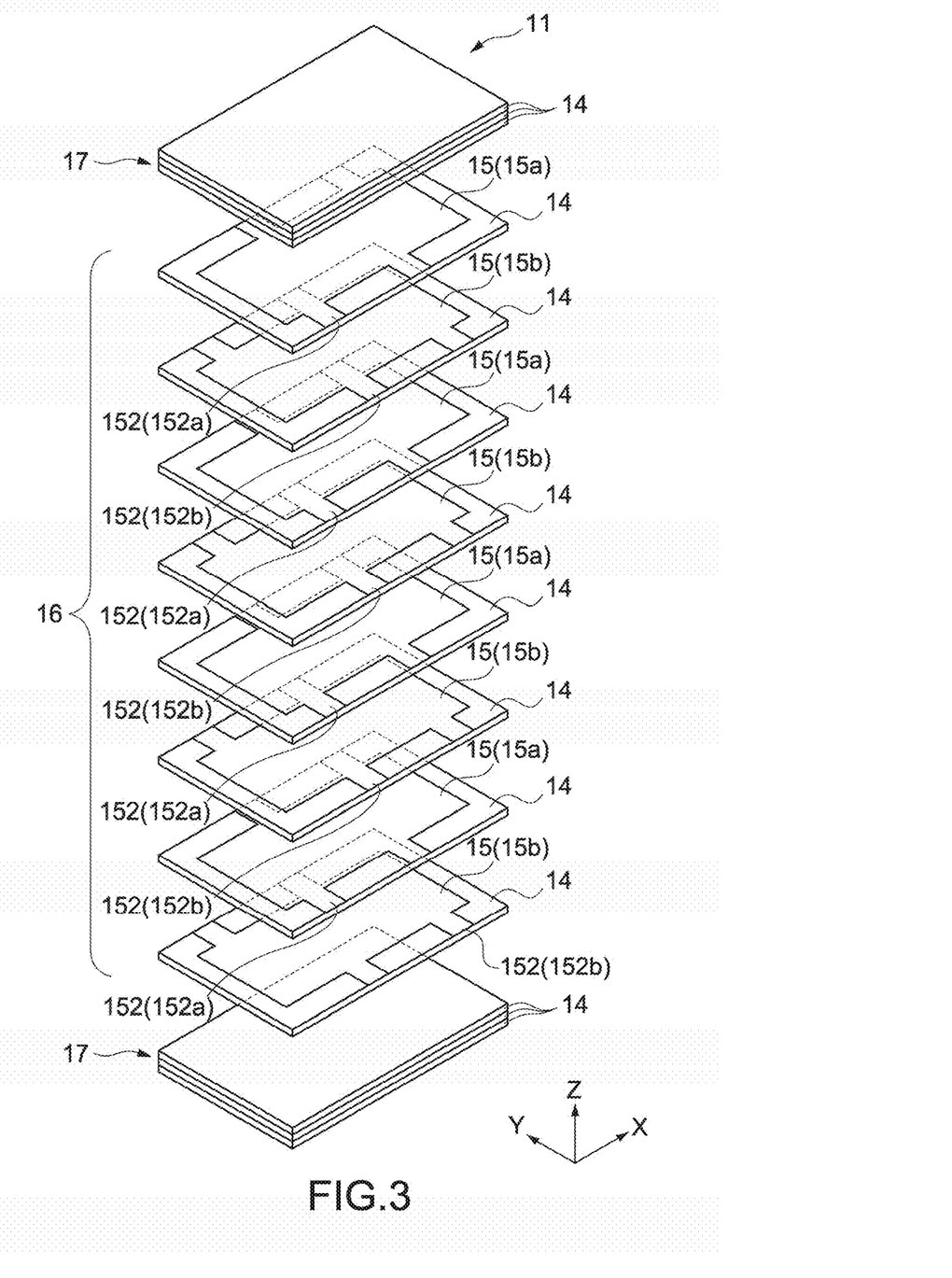
FIG. 3 is an exploded perspective view schematically showing a ceramic body of the multi-layer ceramic capacitor shown in FIG. 1.

FIG. 3 is an exploded perspective view schematically showing the ceramic body 11. Actually, the sintered ceramic body 11 is hardly disassembled, but FIG. 3 shows the disassembled ceramic body 11 for the purpose of description.

As shown in FIG. 3, the ceramic body 11 has a multi-layer structure in which ceramic layers 14 each extending along an X-Y plane are laminated in the Z-axis direction. Specifically, the ceramic body 11 includes the ceramic layers 14 laminated in the Z-axis direction and the internal electrode layers 15 disposed between the ceramic layers 14. Further, the internal electrode layers 15 include first internal electrode layers 15a and second internal electrode layers 15b. The first internal electrode layers 15a and the second internal electrode layers 15b are respectively connected to the external electrodes 12 having different polarities.

As shown in FIG. 3, the ceramic body 11 includes a capacitance forming unit 16 at the center region in the Z-axis direction and covers 17. The capacitance forming unit 16 includes the internal electrode layers 15. The covers 17 sandwich the capacitance forming unit 16 in the Z-axis direction. The capacitance forming unit 16 has a function of forming an electrostatic capacitance. The covers 17 do not form an electrostatic capacitance and have a function of mainly protecting the capacitance forming unit 16, for example.

In the capacitance forming unit 16, the ceramic layers 14 including the first internal electrode layers 15a, and the ceramic layers 14 including the second internal electrode layers 15b are alternately laminated. In the covers 17, the ceramic layers 14 including no internal electrode layers 15a and 15b are laminated.

The ceramic layers 14 are each formed of a ceramic material. Examples of the ceramic material forming the ceramic layers 14 include dielectric ceramics mainly containing barium titanate, strontium titanate, calcium titanate, magnesium titanate, calcium zirconate, calcium titanate zirconate, barium zirconate, and titanium oxide. In this embodiment, those ceramic materials are contained a little in the external electrodes 12 and the internal electrode layers 15.

Further, the ceramic material of the ceramic layers 14 desirably has a dielectric constant of 1,000 or more, or is desirably Class II (of high dielectric type). The ceramic body 11 can be obtained by laminating and sintering a plurality of sheets (green sheets) formed of such a ceramic material, the details of which will be described later.

Since the covers 17 do not form an electrostatic capacitance, the ceramic material of the ceramic layers 14 that forms the covers 17 does not need high dielectric constant. Therefore, the ceramic layers 14 for the covers 17 and the ceramic layers 14 for the capacitance forming unit 16 may be formed of different ceramic materials. However, from the viewpoint of structural stability and the like, the ceramic layers 14 for the covers 17 and the ceramic layers 14 for the capacitance forming unit 16 are desirably formed of a similar ceramic material.

Referring back to FIG. 2, each internal electrode layer 15 includes an electrode main body 151 and extracted portions 152. The electrode main body 151 forms an electrostatic capacitance together with the internal electrode layers 15 adjacent to one another in the Z-axis direction. The extracted portions 152 are extracted from the electrode main body 151 to the circumference of the ceramic layer 14. It should be noted that in FIG. 2, the second internal electrode layer 15b disposed below the first internal electrode layer 15a in the Z-axis direction is shown by a broken line.

The electrode main body 151 is formed into a flat plate shape similar to a rectangle, for example. The electrode main bodies 151 of the internal electrode layers 15 adjacent to one another in the Z-axis direction are disposed to face one another in the Z-axis direction. Typically, the electrode main bodies 151 adjacent to one another in the Z-axis direction are disposed to almost overlap with one another when viewed in the Z-axis direction. In FIG. 2, for the purpose of description, the adjacent electrode main bodies 151 are shown with shifts.

The internal electrode layers 15 contain a metal material as a main component. Examples of the metal material include Ni, Cu, Pd, Pt, Ag, Au, or an alloy of those metals. In this embodiment, Ni may be used. It should be noted that the metal material may be the same metal material as the main component of the external electrodes 12.

Additionally, the internal electrode layers 15 contain, in addition to the main component, the ceramic material used for the ceramic layers 14. As described above, examples of the ceramic material include dielectric ceramics mainly containing barium titanate, strontium titanate, calcium titanate, magnesium titanate, calcium zirconate, calcium titanate zirconate, barium zirconate, and titanium oxide.

Each of the first internal electrode layers 15a includes first extracted portions 152a, which are extracted to the first side surfaces S3 and S4, and is connected to the first external electrodes 12a via the first extracted portions 152a. In the example shown in FIG. 2, two first extracted portions 152a are extracted to the first side surface S3, and two first extracted portions 152a are extracted to the first side surface S4.

Similarly, each of the second internal electrode layers 15b includes second extracted portions 152b, which are extracted to the first side surfaces S3 and S4, and is connected to the second external electrodes 12b via the second extracted portions 152b. In the example shown in FIG. 2, two second extracted portions 152b are extracted to the first side surface S3, and two second extracted portions 152b are extracted to the first side surface S4. As a result, the second extracted portions 152b are connected to the two second external electrodes 12b disposed on the first side surface S3 and to the two second external electrodes 12b disposed on the first side surface S4.

In such a manner, the extracted portions 152a and 152b are extracted to the first side surfaces S3 and S4 facing each other in the lateral direction (Y-axis direction). This can shorten current pathways between the internal electrode layers 15 and the external electrodes 12, when a high-frequency current is provided to the multi-layer ceramic capacitor 100. As a result, the ESL in the multi-layer ceramic capacitor 100 can be reduced.

Further, the first extracted portions 152a and the second extracted portions 152b are alternately disposed along the circumferences of the ceramic layers 14, when viewed in the Z-axis direction. In other words, the extracted portions 152a and 152b, to which voltages having different polarities are applied, are alternately disposed.

As a result, when a high-frequency current is provided to the multi-layer ceramic capacitor 100, magnetic fields formed by the adjacent extracted portions 152a and 152b are cancelled out, and the ESL in the multi-layer ceramic capacitor 100 can be reduced more.

1.5 Width of Extracted Portion

As shown in FIG. 2, each of the extracted portions 152 is formed to have a width W of 100 µm or less. The width W extends along the circumference of the ceramic layer 14. When the width W of each extracted portion 152 is determined as described above, if the number of terminals (i.e., the number of external electrodes 12) is increased, the miniaturization of the multi-layer ceramic capacitor 100 can be achieved.

In general, the electrode material mainly containing a metal material and the ceramic material have different amounts of thermal shrinkage at the time of sintering.

Therefore, when the ceramic body is sintered, the internal electrode layers shrink in a larger amount than the ceramic body, and the extracted portions may regress inward. In particular, when the width W is very narrow as described above, the entire extracted portions are highly likely to regress inward. This may easily lead to poor connection with the external electrodes.

In this regard, in this embodiment, the multi-layer ceramic capacitor 100 is produced by the following method.

2. Method of Producing Ceramic Electronic Component (Multi-Layer Ceramic Capacitor)

Figure 4:
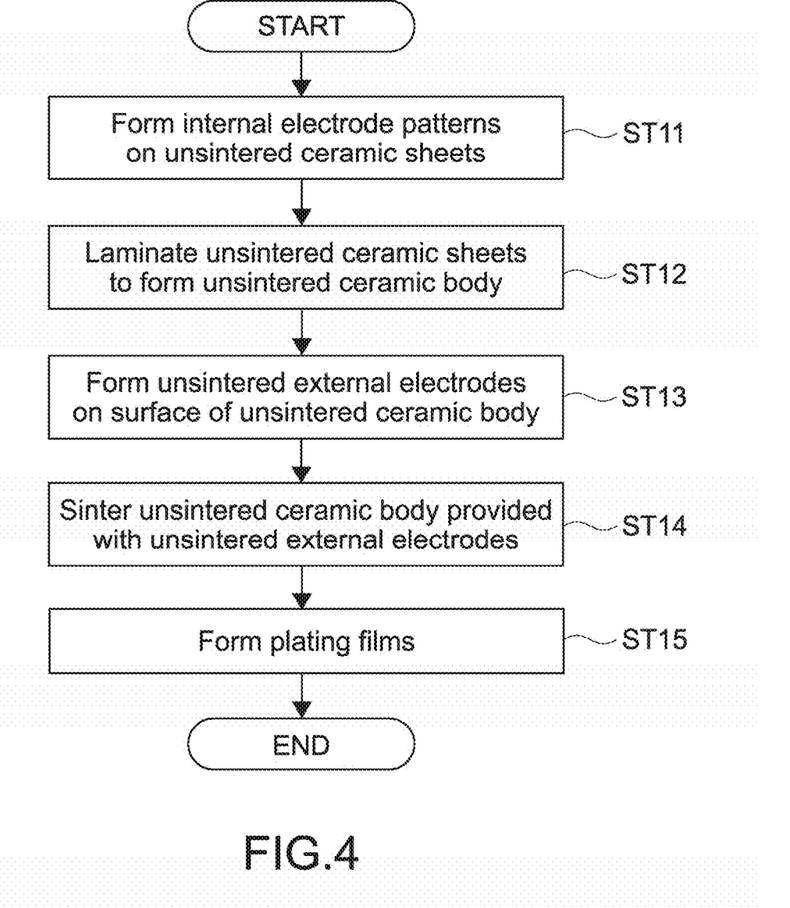
FIG. 4 is a flowchart showing a method of producing the multi-layer ceramic capacitor shown in FIG. 1.

A method of producing the multi-layer ceramic capacitor 100 will be described. FIG. 4 is a flowchart showing a method of producing the multi-layer ceramic capacitor 100. FIGS. 5A to 8 are views showing a production process for the multi-layer ceramic capacitor 100.

2.1 Step ST11: Internal Electrode Pattern Forming Step

In this step, ceramic sheets 14U are prepared. The ceramic sheets 14U are formed of the ceramic material and unsintered. Internal electrode patterns 15U are formed on those unsintered ceramic sheets 14U.

Figure 5A:
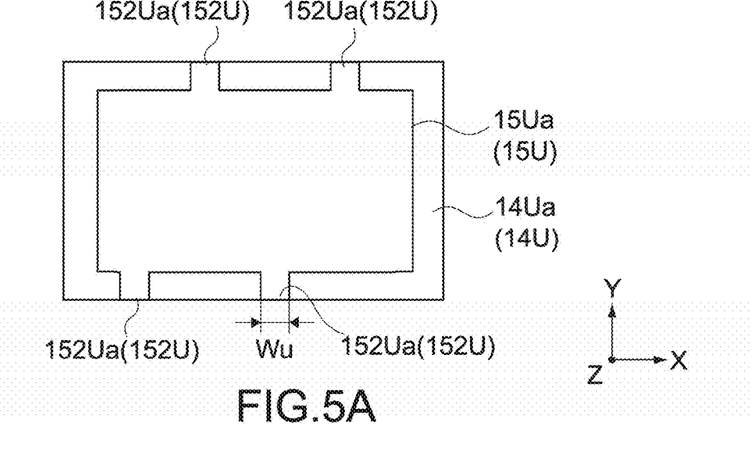
FIG. 5A is a view showing a production process for the multi-layer ceramic capacitor and is also a plan view of a ceramic sheet on which an internal electrode pattern is formed.
Figure 5B:
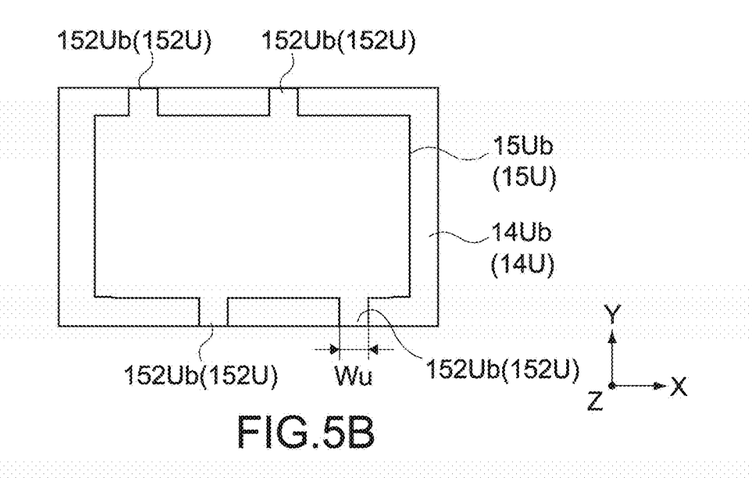
FIG. 5B is a view showing the production process for the multi-layer ceramic capacitor and is also a plan view of a ceramic sheet on which another internal electrode pattern is formed.
Figure 5C:
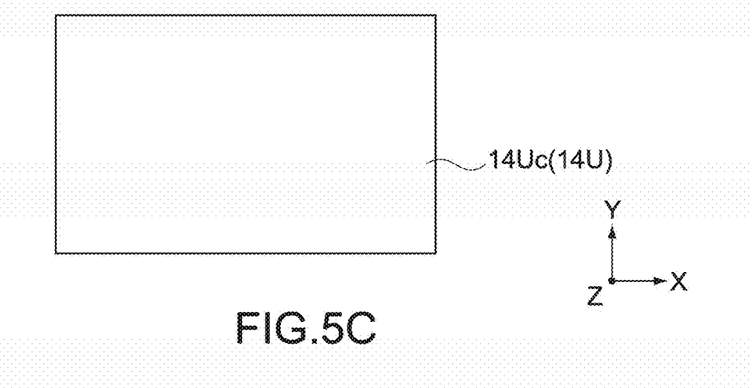
FIG. 5C is a view showing the production process for the multi-layer ceramic capacitor and is also a plan view of a ceramic sheet on which the internal electrode pattern is not formed.

FIGS. 5A, 5B, and 5C are plan views of the ceramic sheets 14U on which the internal electrode patterns 15Ua and 15Ub are formed in this step. FIG. 5A shows a ceramic sheet 14Ua on which an internal electrode pattern 15Ua corresponding to the first internal electrode layer 15a is formed. FIG. 5B shows a ceramic sheet 14Ub on which an internal electrode pattern 15Ub corresponding to the second internal electrode layer 15b is formed. FIG. 5C shows a ceramic sheet 14Uc on which the internal electrode patterns 15Ua and 15Ub are not formed.

Each of the internal electrode patterns 15U includes extracted portions 152U. The extracted portions 152U are extracted to the circumference of the ceramic sheet 14U. The internal electrode patterns 15U include the internal electrode patterns 15Ua corresponding to the first internal electrode layers 15a, and the internal electrode patterns 15Ub corresponding to the second internal electrode layers 15b.

In Step ST11, ceramic slurry is first prepared to form the ceramic sheets 14U. The ceramic slurry is obtained by mixing the ceramic material, a solvent (ethanol etc.), a binder (polyvinyl butyral etc.), and an additive (dispersant etc.), for example. The ceramic material may be powdered dielectric ceramics made of barium titanate, strontium titanate, calcium titanate, magnesium titanate, calcium zirconate, calcium titanate zirconate, barium zirconate, titanium oxide, or the like.

The above-mentioned ceramic slurry is formed into a sheet, to obtain the ceramic sheets 14U. For the forming of the ceramic slurry, for example, forming devices such as a die coater and a gravure coater can be used.

Subsequently, in order to form the internal electrode patterns 15U, a conductive paste containing a metal material is prepared first. The metal paste is obtained by mixing a metal material (nickel powder etc.), a solvent (terpineol etc.), a binder (ethyl cellulose etc.), and an additive (dispersant etc.), for example.

In this embodiment, the internal electrode patterns 15U may further contain the ceramic material such as the powered dielectric ceramics used for the ceramic sheets 14U. For example, when the whole of the internal electrode pattern 15U is assumed to have 100 pts.mass, the internal electrode pattern 15U may contain the ceramic material of 10 pts.mass or more and 20 pts.mass or less.

The above-mentioned metal paste is printed on the ceramic sheets 14U, so that the internal electrode patterns 15Ua and 15Ub can be formed. For printing of the metal paste, for example, printers such as a screen printer and a gravure printer can be used.

As shown in FIG. 5A, the internal electrode pattern 15Ua includes the extracted portions 152Ua. As shown in FIG. 5B, the internal electrode pattern 15Ub includes the extracted portions 152Ub.

The extracted portions 152Ua and 152Ub are each formed such that a width Wu extending along the circumference is 100 μm or less after the sintering. A specific numerical value of the width Wu can be set in light of a shrinkage percentage of the internal electrode patterns 15U due to the sintering.

2.2 Step ST12: Lamination Step

Subsequently, the ceramic sheets 14U including the internal electrode patterns 15U are laminated in the Z-axis direction, to form an unsintered ceramic body 11U.

Figure 6:
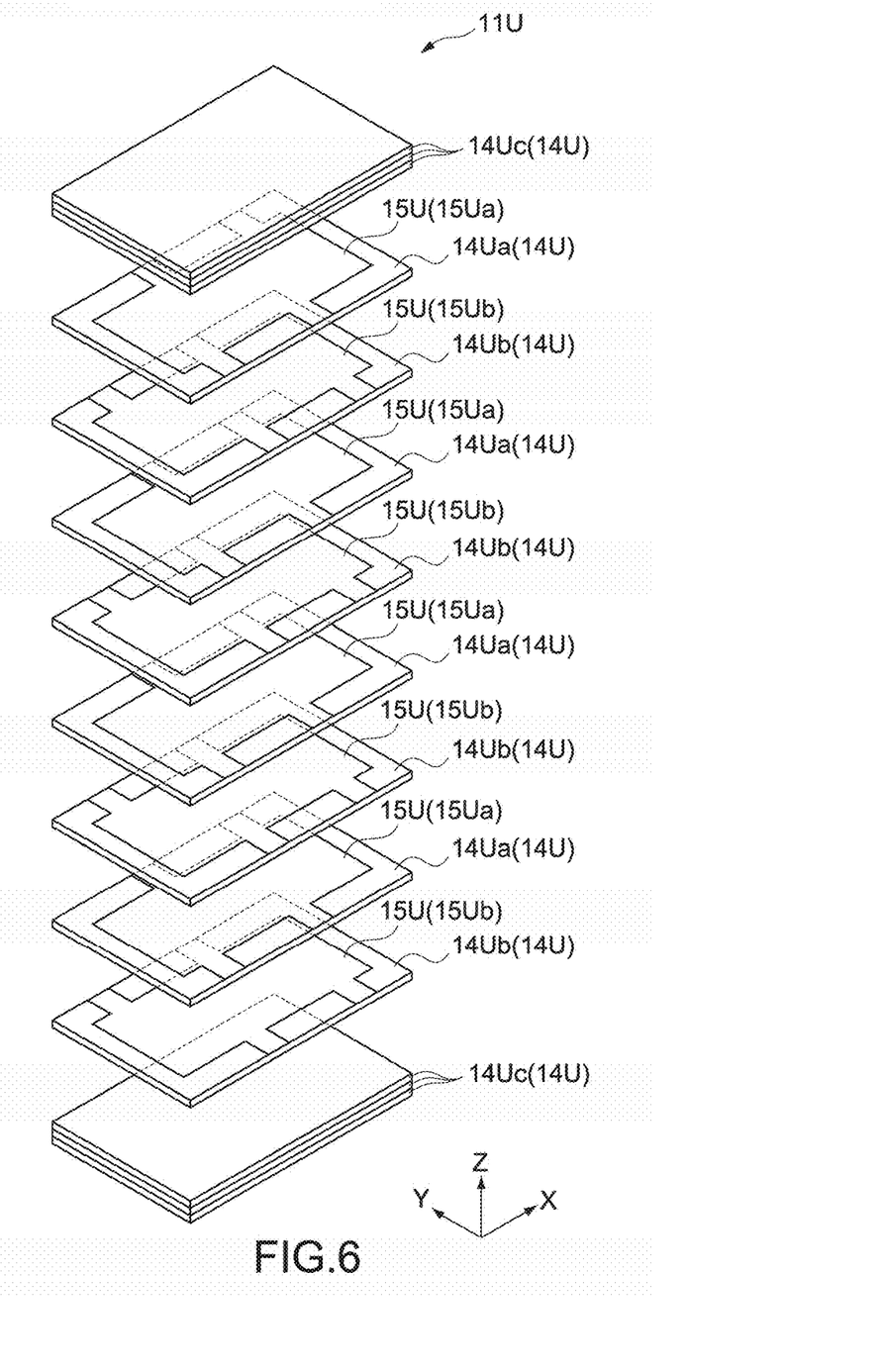
FIG. 6 is a view showing the production process for the multi-layer ceramic capacitor and is also an exploded perspective view schematically showing a laminated state of the ceramic sheets in a lamination step.

FIG. 6 is an exploded perspective view showing a laminated state of the ceramic sheets 14Ua, 14Ub, and 14Uc in this step.

As shown in FIG. 6, the ceramic sheets 14Ua, 14Ub, and 14Uc respectively shown in FIGS. 5A, 5B, and 5C are laminated to have the configuration shown in FIG. 3, and then pressure-bonded, to obtain an unsintered ceramic body 11U. For the pressure-bonding, thermocompression bonding, isostatic pressing, and the like can be applied. For the lamination of the ceramic sheets 14U, for example, a lamination device such as a movable suction head can be used.

Figure 7:
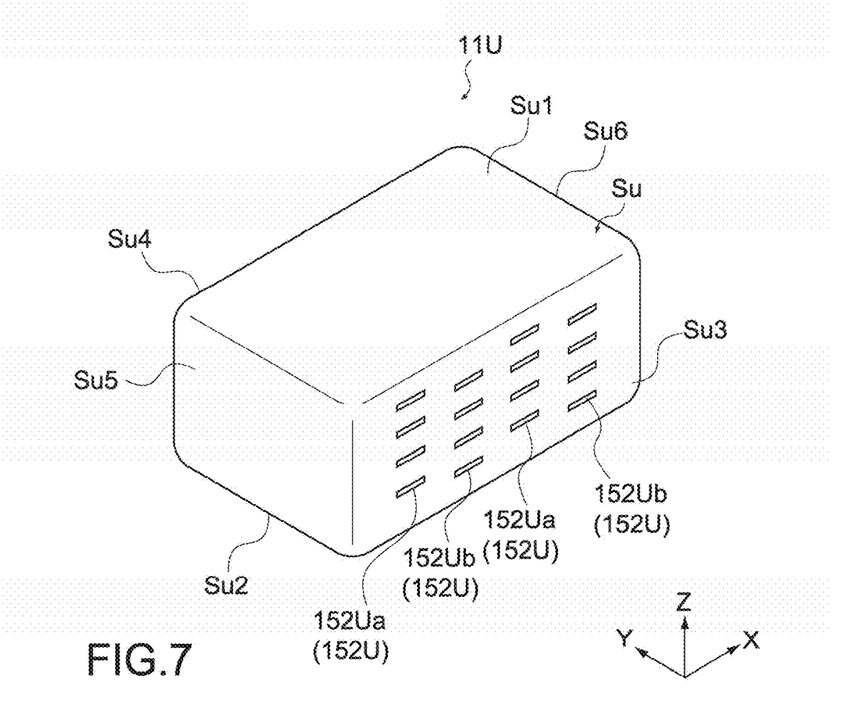
FIG. 7 is a view showing the production process for the multi-layer ceramic capacitor and is also a perspective view schematically showing an unsintered ceramic body formed in the lamination step.

FIG. 7 is a perspective view schematically showing the unsintered ceramic body 11U after the lamination. As shown in FIG. 7, the extracted portions 152Ua and 152Ub are exposed to a surface Su of the unsintered ceramic body 11U. Further, in this embodiment, the surface Su includes main surfaces Su1 and Su2, a pair of first side surfaces Su3 and Su4, and a pair of second side surfaces Su5 and Su6. The main surfaces Su1 and Su2 respectively correspond to the main surfaces S1 and S2. The first side surfaces Su3 and Su4 respectively correspond to the first side surfaces S3 and S4. The second side surfaces Su5 and Su6 respectively correspond to the second side surfaces S5 and S6. The extracted portions 152Ua and 152Ub are exposed to the first side surfaces Su3 and Su4.

2.3 Step ST13: External Electrode Forming Step

Subsequently, unsintered external electrodes 12U (12Ua and 12Ub) containing the ceramic material are formed on the surface Su of the unsintered ceramic body 11U so as to be connected to the extracted portions 152Ua and 152Ub.

Figure 8:
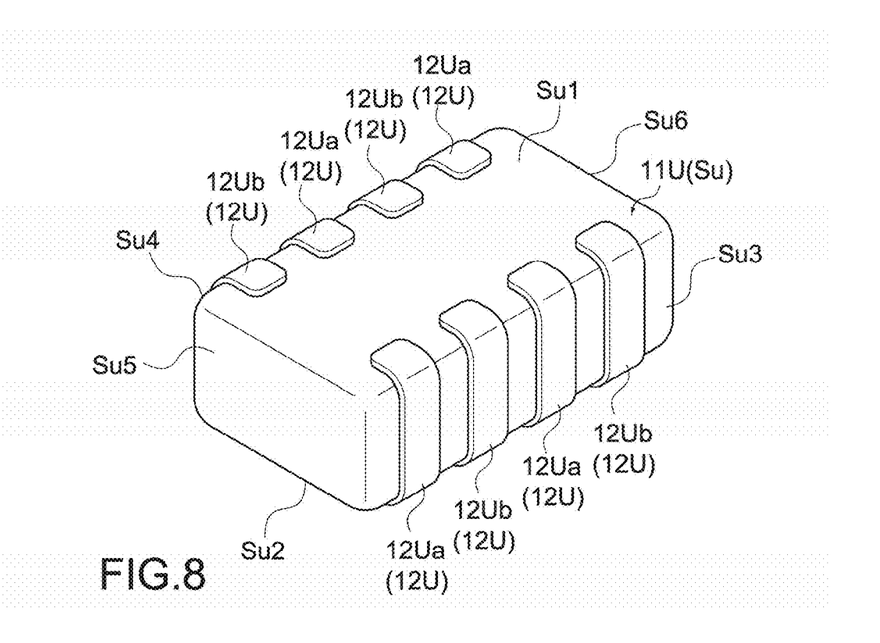
FIG. 8 is a view showing the production process for the multi-layer ceramic capacitor and is also a perspective view schematically showing the unsintered ceramic body on which external electrodes are formed.

FIG. 8 is a perspective view schematically showing the unsintered ceramic body 11U on which the external electrodes 12Ua and 12Ub are formed.

In this step, in order to form the external electrodes 12U, a conductive paste mainly containing a metal material is prepared first. The metal paste is obtained by mixing a metal material (nickel powder etc.), a solvent (terpineol etc.), a binder (ethyl cellulose etc.), and an additive (dispersant etc.), for example. As described above, for the metal material, the same metal material as the metal material used for the internal electrode patterns can be used.

The external electrodes 12U further contain the ceramic material such as the powered dielectric ceramics used for the ceramic sheets 14U. For example, when the whole of the external electrode 12U is assumed to have 100 pts.mass, the external electrode 12U may contain the ceramic material of 10 pts.mass or more and 40 pts.mass or less.

Subsequently, the metal paste containing the ceramic material is applied to the surface Su so as to cover the exposed extracted portions 152Ua and 152Ub. As a result, the unsintered external electrodes 12Ua and 12Ub as shown in FIG. 8 are formed.

For the application of the conductive paste to the ceramic body 11U, for example, application devices such as a roller coater and a dip coater can be used.

Step ST14: Sintering Step

In this step, the unsintered ceramic body 11U provided with the unsintered external electrodes 12U is sintered. In other words, the unsintered ceramic body 11U is heated and sintered, so that the ceramic element shown in FIG. 1 is obtained. For example, the ceramic body 11U can be sintered in a reduction atmosphere or a low-oxygen partial pressure atmosphere by using sintering devices such as a tunnel-type sintering furnace and a box-type sintering furnace.

In such a manner, in this embodiment, the internal electrode layers 15, the ceramic body 11, and the external electrodes 12 can be sintered in the same step.

It should be noted that the ceramic material contained in the external electrodes 12U may remain in the external electrodes 12 sintered as described above. Further, similarly, the ceramic material may remain in the internal electrode layers 15.

2.5 Step ST15: Plating Step

Lastly, plating is performed so as to cover the sintered external electrodes 12, and the plating films 13 are thus formed. Typically, the plating is electroplating using the external electrodes 12 as base, but electroless plating or the like may be performed.

As a result, the multi-layer ceramic capacitor 100 is produced. It should be noted that the multi-layer ceramic capacitor 100 may be produced by another production method.

Operation and Effect of this Embodiment

Figure 9:
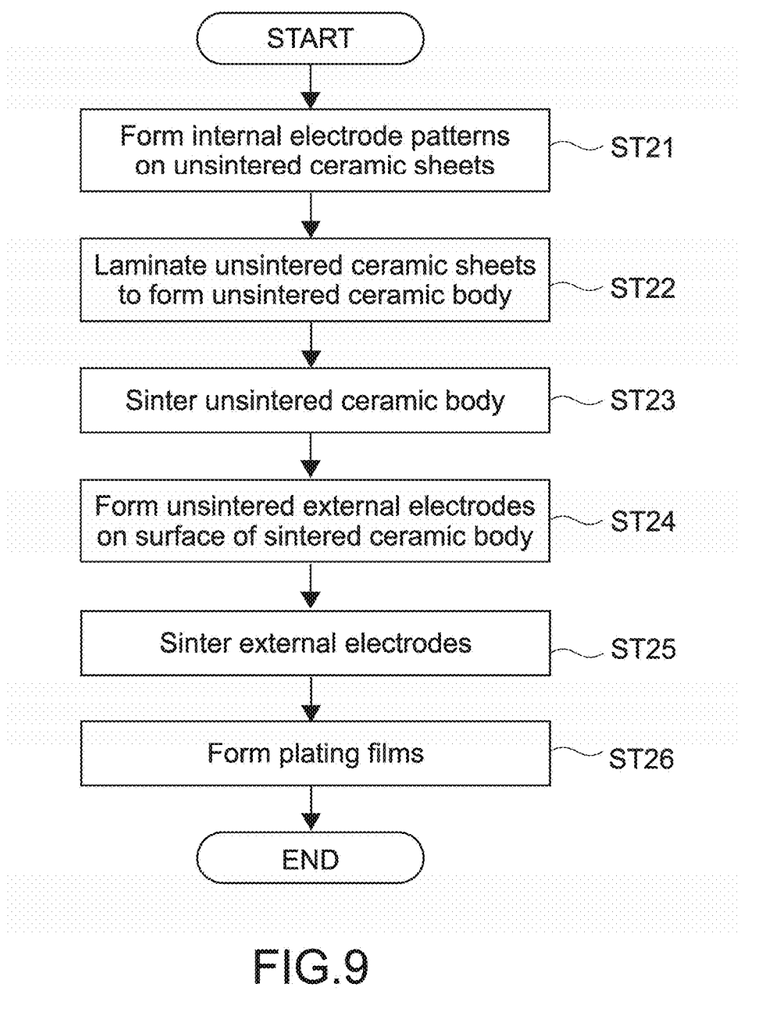
FIG. 9 is a flowchart showing a method of producing a multi-layer ceramic capacitor according to a reference example of this embodiment.

FIG. 9 is a flowchart showing a method of producing a multi-layer ceramic capacitor according to a reference example of this embodiment and showing a method generally performed.

It should be noted that ST21 (internal electrode pattern forming step), ST22 (lamination step), and ST26 (plating step) of FIG. 9 are similar to ST11, ST12, and ST15 described above, and description thereof will be omitted.

In the method shown in FIG. 9, the unsintered ceramic body is sintered before the unsintered external electrodes are formed (ST23). Subsequently, the unsintered external electrodes are formed on the surface of the sintered ceramic body so as to be connected to the extracted portions (ST24), and the external electrodes are then sintered (ST25).

In such a method, however, when the unsintered ceramic body is sintered, the internal electrode patterns are sintered at high speed and thermally shrink in a larger amount than the ceramic sheets. Due to the large thermal shrinkage, the extracted portions may regress and may be not exposed on the surface of the ceramic body. This may inhibit connection between the external electrodes and the extracted portions. Such a tendency is particularly more prominent as the width of each extracted portion is narrower.

In this regard, in the multi-layer ceramic capacitor 100 of this embodiment, the unsintered ceramic body 11U and the external electrodes 12U are sintered in the same step. As a result, the extracted portions 152U of the internal electrode patterns 15U and the external electrodes 12U are sintered in a connected state. This can enhance reliability of connection between the extracted portions 152 and the external electrodes 12.

Meanwhile, when the width of each extracted portion is narrow, stress caused by a difference in thermal shrinkage is likely to lead to poor connection between the external electrodes and the extracted portions, and it may be still difficult to ensure sufficient reliability of connection.

For that reason, the external electrodes 12 of this embodiment contain the ceramic material. The ceramic material can slow down the speed at which the external electrodes are sintered, with the result that a difference in thermal shrinkage between the external electrodes and the ceramic sheets can be reduced. Consequently, the stress associated with the difference in thermal shrinkage can be reduced, and the reliability of connection between the extracted portions 152 and the external electrodes 12 can be enhanced more.

Further, in addition to the external electrodes 12, the internal electrode layers 15 also contain the ceramic material. This can also slow down the speed at which the internal electrode layers 15 are sintered, and can reduce thermal shrinkage of the internal electrode layers 15. As a result, stress generated when the extracted portions 152 regress inward can also be reduced, and the reliability of connection between the extracted portions 152 and the external electrodes 12 can be enhanced more.

Additionally, when the same metal material is used for the external electrodes 12 and the internal electrode layers 15, thermal shrinkage percentages of the external electrodes 12 and the internal electrode layers 15 can be made substantially the same, and the reliability of connection between the extracted portions 152 and the external electrodes 12 can be enhanced more.

In particular, when Ni having a relatively high melting point is used for the metal material, the external electrodes 12 and the internal electrode layers 15 can be sintered at a sintering temperature suitable for the sintering of the ceramic material, and costs of the metal material can also be controlled.

As described above, according to this embodiment, it is possible to provide a multi-layer ceramic capacitor 100 in which the widths of the extracted portions 152 along the circumferences of the ceramic layers 14 are each 100 µm or less and which has high reliability of connection between the internal electrode layers 15 and the external electrodes 12. Therefore, this configuration can contribute to the miniaturization and achievement of a multi-terminal structure of the multi-layer ceramic capacitor 100.

4. Modified Example

Hereinafter, a modified example of this embodiment will be described. It should be noted that similar configurations are denoted by the same reference symbols and description thereof will be omitted.

Figure 10:
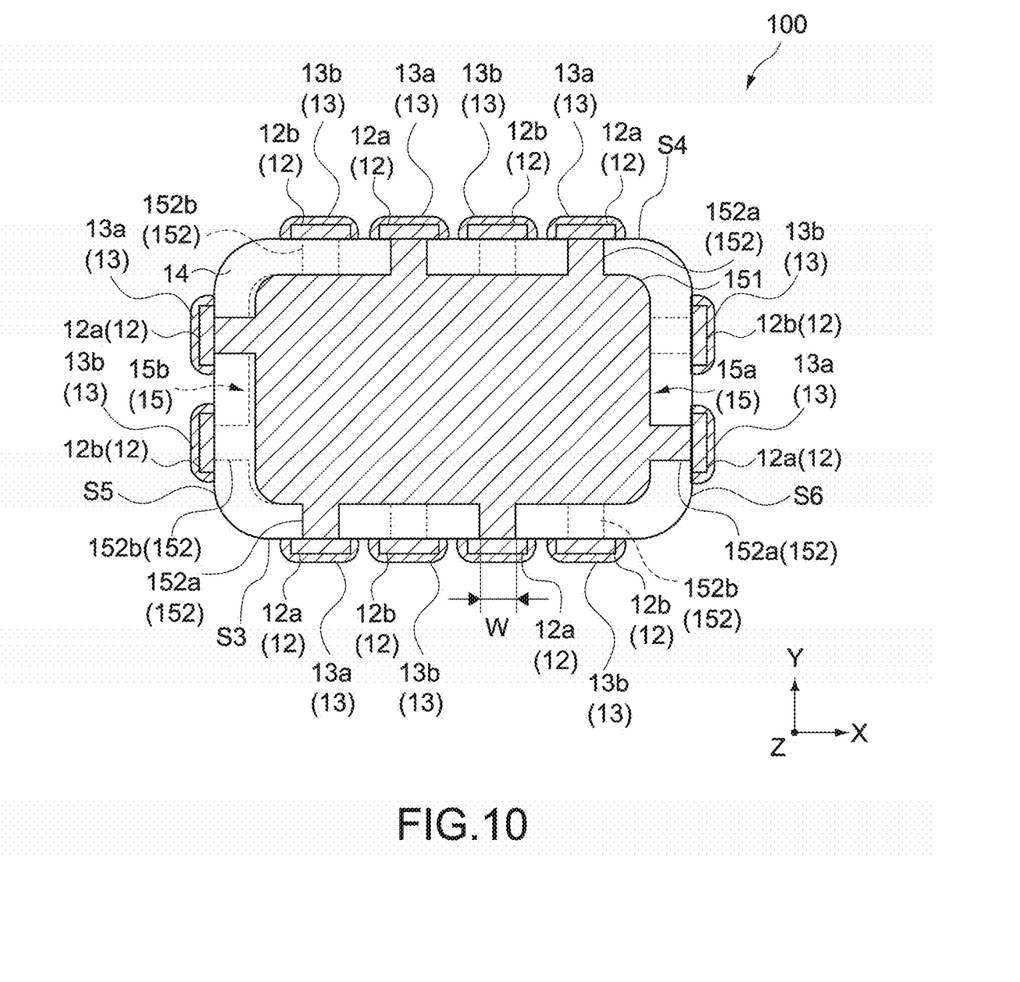
FIG. 10 is a cross-sectional view of a multi-layer ceramic capacitor according to one modified example of this embodiment when viewed in the Z-axis direction.

FIG. 10 is a cross-sectional view of a multi-layer ceramic capacitor 100 according to one modified example of this embodiment. Similarly to FIG. 2, FIG. 10 is a cross-sectional view when viewed in the Z-axis direction.

As shown in FIG. 10, the external electrodes 12 may be provided to at least one side surface of the pair of first side surfaces S3 and S4 and at least one side surface of the pair of second side surfaces S5 and S6. Additionally, the external electrodes 12 may be disposed on each of the first side surfaces S3 and S4. For example, three or more external electrodes 12 may be disposed on each of the first side surfaces S3 and S4. Further, the external electrodes 12 may be disposed on each of the second side surfaces S5 and S6.

This configuration can also provide a small, multi-terminal-type multi-layer ceramic capacitor 100 in which the widths of the extracted portions 152 along the circumferences of the ceramic layers 14 are each 100 μm or less and which has high reliability of connection.

Figure 11:
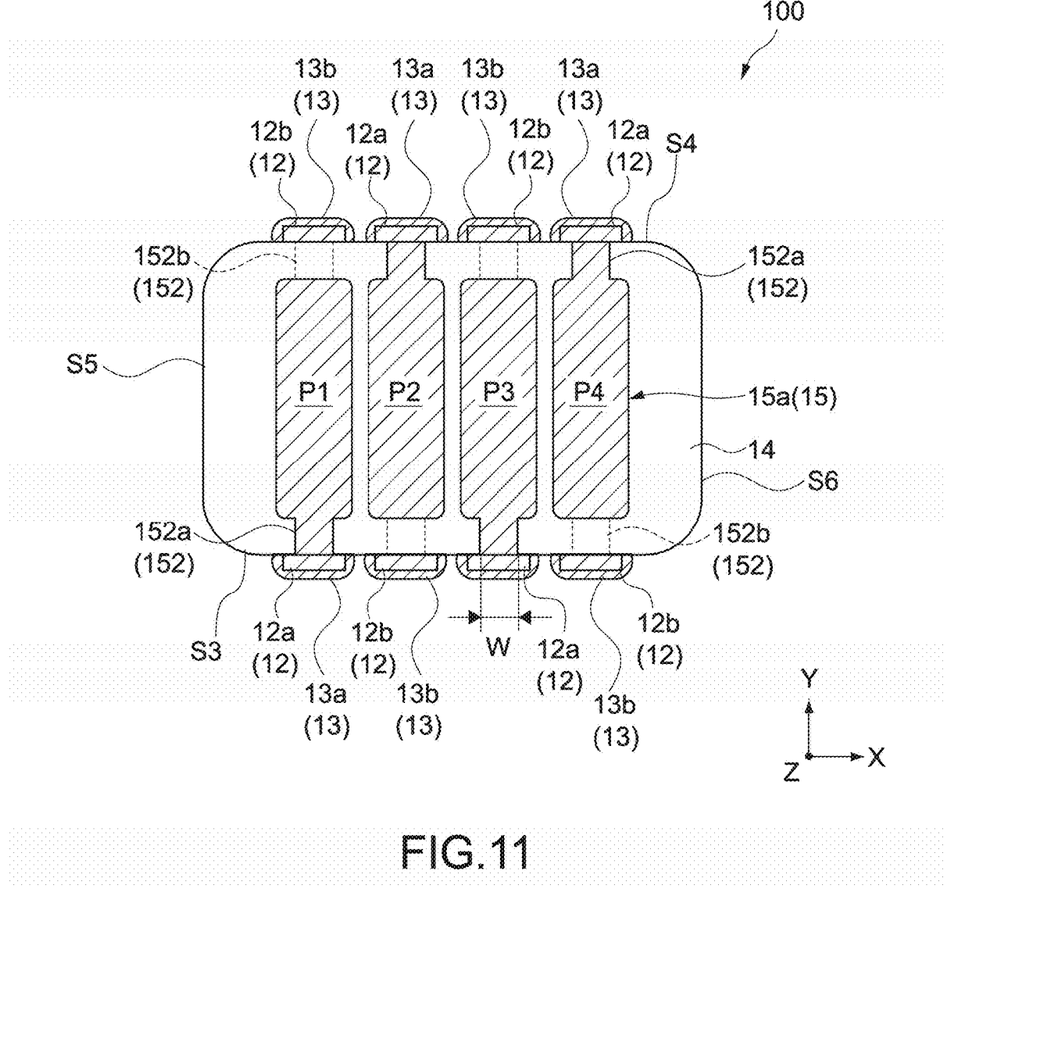
FIG. 11 is a cross-sectional view of a multi-layer ceramic capacitor according to another modified example of this embodiment when viewed in the Z-axis direction.

FIG. 11 is a cross-sectional view of a multi-layer ceramic capacitor 100 according to another modified example of this embodiment. Similarly to FIG. 2, FIG. 11 is a cross-sectional view when viewed in the Z-axis direction.

As shown in FIG. 11, each internal electrode layer 15 includes electrode pieces P1, P2, P3, and P4. For example, the electrode pieces P1 to P4 extend along the Y-axis direction and are arrayed along the X-axis direction. Further, each of the electrode pieces P1 to P4 includes at least one extracted portion 152. The extracted portions 152 of the electrode pieces P1 and P3 are extracted to one of the first side surfaces, i.e., the first side surface S3, and the extracted portions 152 of the electrode pieces P2 and P4 to the other first side surface S4.

This configuration can also provide an array-type multi-layer ceramic capacitor 100 in which the widths of the extracted portions 152 along the circumferences of the ceramic layers 14 are each 100 μm or less and which has high reliability of connection.

Figure 12A:
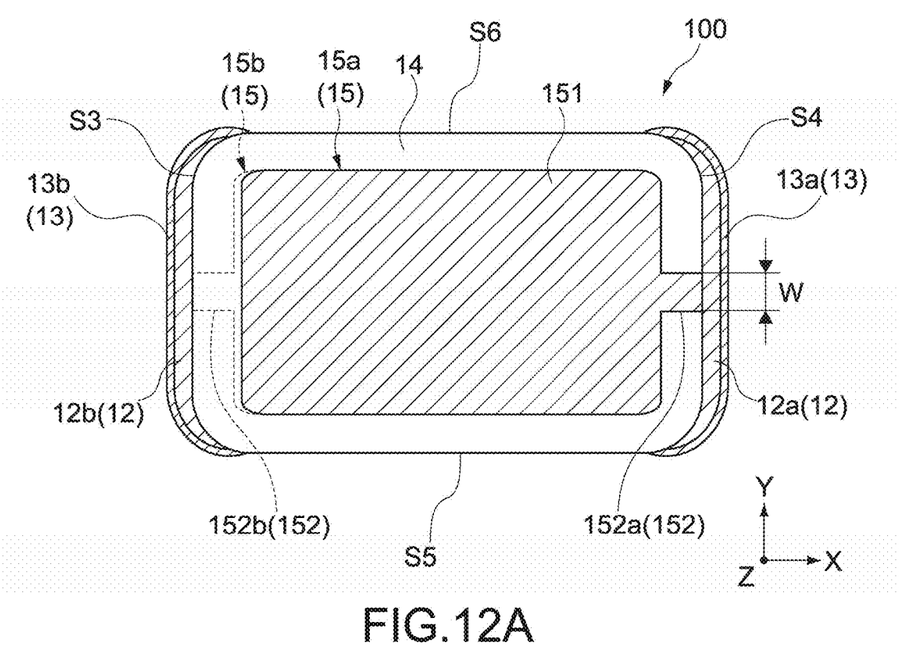
FIG. 12A is a cross-sectional view of a multi-layer ceramic capacitor according to still another modified example of this embodiment when viewed in the Z-axis direction.
Figure 12B:
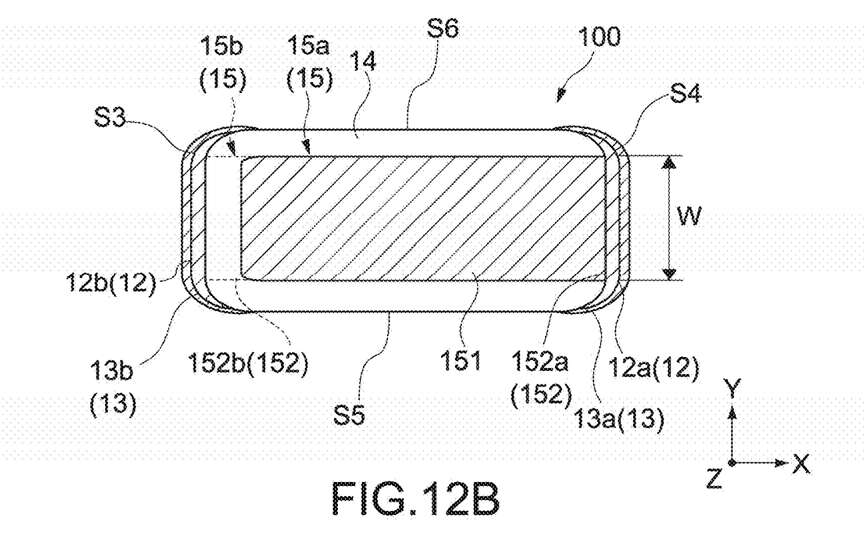
FIG. 12B is a cross-sectional view of a multi-layer ceramic capacitor according to still another modified example of this embodiment when viewed in the Z-axis direction.

FIGS. 12A and 12B are each a cross-sectional view of a multi-layer ceramic capacitor 100 according to another modified example of this embodiment. Similarly to FIG. 2, FIGS. 12A and 12B are cross-sectional views when viewed in the Z-axis direction.

As shown in FIG. 12A, the external electrodes 12 are provided to the pair of first side surfaces S3 and S4. The multi-layer ceramic capacitor 100 may not have a so-called multi-terminal-type. In other words, the external electrodes 12 may be disposed one by one on one side surface and the other side surface of the pair of side surfaces. In the example shown in FIG. 12A, a first external electrode 12a is disposed on one of the first side surfaces S3 and S4, i.e., the first side surface S4, and a second external electrode 12b is disposed on the other one of the first side surfaces S3 and S4, i.e., the first side surface S3. Also in this case, the width W of the extracted portion 152 along the circumference of each ceramic layer 14 may be 100 μm or less.

It should be noted that the pair of first side surfaces S3 and S4 may be side surfaces facing each other in the longitudinal direction (X-axis direction) as shown in FIG. 12A.

Further, as shown in FIG. 12B, the width of the electrode main body 151 may be substantially the same as the width of the extracted portion 152. In this case, the extracted portion 152 is defined as a portion that is extracted to the circumference of the ceramic layer in the internal electrode layer 15 and does not face another electrode main body 151 adjacent in the Z-axis direction. In such a manner, the present invention can also be applied to a very small ceramic electronic component such as a multi-layer ceramic capacitor 100.

Further, the three-dimensional shape of the ceramic body is not limited to the above-mentioned shape. For example, the first, second, and third axis directions in which the main surfaces face each other and the side surfaces face each other are not limited to be orthogonal to one another and only need to at least intersect with one another. In other words, the second axis direction only needs to intersect with the first axis direction, and the third axis direction only needs to intersect with the first and second axis directions.

Further, in the embodiment described above, the example in which the ceramic electronic component is a multi-layer ceramic capacitor has been described. The present invention can also be applied to other electronic components in which a ceramic body has a multi-layer structure including ceramic layers and internal electrode layers and external electrodes are provided to the surface of the ceramic body.

For example, examples of the ceramic electronic component include an inductor and a piezoelectric element in addition to the multi-layer ceramic capacitor.

Hereinabove, the embodiment of the present invention has been described. The present invention is not limited to the above-mentioned embodiment and can be variously modified without departing from the gist of the present invention as a matter of course.

What is claimed is:

1. A ceramic electronic component, comprising:
   a ceramic body including
   ceramic layers formed of a ceramic material and laminated in a first axis direction, and
   internal electrode layers containing the ceramic material, each internal electrode including an extracted portion and disposed between the ceramic layers, the extracted portion being extracted to a circumference of each of the ceramic layers and having a width of 100 μm or less along the circumference; and
   external electrodes containing the ceramic material, the external electrodes being provided to a surface of the ceramic body and each connected to the extracted portion.

2. The ceramic electronic component according to claim 1, wherein
   the surface of the ceramic body includes
   a pair of main surfaces facing each other in the first axis direction, and
   a pair of first side surfaces adjacently connected to the pair of main surfaces and facing each other in a second axis direction intersecting with the first axis direction, and
   the external electrodes are provided to the pair of first side surfaces.

3. The ceramic electronic component according to claim 2, wherein
   the external electrodes include three or more pairs of external electrodes, the three or more pairs of external electrodes being provided to each of one side surface and the other side surface of the pair of first side surfaces.

4. The ceramic electronic component according to claim 2, wherein
   the surface of the ceramic body further includes a pair of second side surfaces adjacently connected to the pair of main surfaces and facing each other in a third axis direction intersecting with the first axis direction and the second axis direction, and
   the external electrodes are provided to at least one side surface of the pair of first side surfaces and at least one side surface of the pair of second side surfaces.

5. The ceramic electronic component according to claim 1, wherein
   the ceramic body has a length of 1 mm or less along a longitudinal direction and a length of 0.5 mm or less along a lateral direction when the ceramic body is viewed in the first axis direction.

6. The ceramic electronic component according to claim 1, wherein
   the external electrodes contain a metal material as a main component, the metal material being the same as a main component of the internal electrode layers.

7. The ceramic electronic component according to claim 6, wherein
   the metal material is nickel (Ni).

* * * * *